(12) United States Patent
Chess et al.

(10) Patent No.: US 8,739,280 B2
(45) Date of Patent: May 27, 2014

(54) CONTEXT-SENSITIVE TAINT ANALYSIS

(75) Inventors: Brian V Chess, Palo Alto, CA (US); Sean Patrick Fay, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 140 days.

(21) Appl. No.: 13/248,948

(22) Filed: Sep. 29, 2011

(65) Prior Publication Data

US 2013/0086676 A1    Apr. 4, 2013

(51) Int. Cl.
*G06F 21/00* (2013.01)

(52) U.S. Cl.
USPC .............................. 726/22; 713/194; 713/166

(58) Field of Classification Search
None
See application file for complete search history.

(56) References Cited

U.S. PATENT DOCUMENTS

| | | | |
|---|---|---|---|
| 7,530,107 B1 | 5/2009 | Ono et al. | |
| 8,127,360 B1 * | 2/2012 | Wilhelm et al. | 726/25 |
| 2007/0143843 A1 * | 6/2007 | Nason et al. | 726/22 |
| 2008/0184208 A1 | 7/2008 | Sreedhar et al. | |
| 2010/0257610 A1 | 10/2010 | Hohl | |
| 2011/0145918 A1 * | 6/2011 | Jung et al. | 726/22 |
| 2012/0167209 A1 * | 6/2012 | Molnar et al. | 726/22 |
| 2013/0024939 A1 * | 1/2013 | Glew et al. | 726/24 |

OTHER PUBLICATIONS

Di Lucca, G.A. et al., Identifying Cross Site Scripting Vulnerabilities in Web Applications, (Research Paper), Proceedings of Sixth IEEE International Workshop on Web Site Evolution, 2004, Sep. 11, 2004, pp. 71-80.

Sun, F. et al., Client-side Detection of XSS Worms by Monitoring Payload Propagation, (Research Paper), ESORICS'09 Proceedings of the 14th European Conference on Research in Computer Security, 2009, pp. 539-554.

Vogt, P. et al., Cross-site Scripting Prevention with Dynamic Data Tainting and Static Analysis (Research Paper) [online], University of California, Santa Barbara [retrieved on Oct. 6, 2011]. Retrieved from the Internet: <URL: http://citeseerx.ist.psu.edu/viewdoc/download-?doi=10.1.1.129.2063&rep=rep1&type=pdf>.

* cited by examiner

*Primary Examiner* — Gilberto Barron, Jr.
*Assistant Examiner* — Malcolm Cribbs
(74) *Attorney, Agent, or Firm* — Benjamin Searle (57) ABSTRACT

A taint processing applied to a tainted value of an application is identified and an output context of the application associated with output of the tainted value is determined. It is determined whether the taint processing is effective in mitigating a security vulnerability caused by the tainted value for the output context.

22 Claims, 5 Drawing Sheets

CONTEXT-SENSITIVE TAINT ANALYSIS

BACKGROUND

Taint analysis is a computer security methodology used to mitigate or prevent input to an application from corrupting data values within and output from the application. As an example, tainted values received by an application from an untrusted source are labeled or tagged. Similarly, when tainted values are used to modify other data values within the application, those data values become tainted (or tainted values) and are similarly labeled or tagged. Thus, the tainted values and their effects can be tracked within the application. When tainted values are output from the application (e.g., stored or provided to a user or client of the application), the use of a tainted value can be recorded to identify a potential security vulnerability in the application.

Additionally, some taint analysis systems remove the label or tag from a tainted value if a taint processing is applied to that tainted value. Accordingly, the use of tainted values to which a taint processing is applied is not recorded. A taint processing is a routine or method that is applied to a tainted value to prevent that tainted value from posing a security vulnerability in the application. For example, taint processing can be validation. That is, a tainted value can be provided to a validation routine to ensure that the tainted value does not include data that opens a security vulnerability in the application. If the tainted value does not include such data, the taint is removed and the application continues execution. If the tainted value does include such data, the application generates a security exception As another example, taint processing can be sanitization. In other words, a tainted value can be provided to a sanitization routine to sanitize the tainted value of any data that opens a security vulnerability in the application. The label or tag is removed from tainted values provided to the sanitization routine.

DETAILED DESCRIPTION

Removal of labels or tags from tainted values can be beneficial to decrease the number or rate of false positive security determinations (e.g., recorded uses of tainted values from which taints have been removed). That is, because a data value derived from (or influenced by) a tainted value becomes a tainted value and is labeled or tagged similar to the tainted value from which it is derived, many data values within an application can be tainted values. If the labels or tags are not removed from tainted values to which taint processings that sufficiently mitigate or prevent security vulnerabilities have been applied, each time those previously labeled or tagged tainted values are output from the application, a use of a tainted value is recorded. Accordingly, many of the recorded uses of tainted values do not represent a security vulnerability. If the labels or tags are removed from the tainted values to which taint processing has been applied, the number of such false positive security determinations can be decreased.

However, such removal of labels or tags can result in an undesirable number or rate of false negative security determinations (e.g., unrecorded uses of tainted values). For example, a taint processing applied to a tainted value can be compatible with (e.g., sufficiently mitigate a potential security vulnerability for) one output context, but incompatible with (e.g., not mitigate a potential security vulnerability for) another output context. A potential security vulnerability exists if the label or tag is removed from a tainted value that is subsequently output from the application in an output context that is incompatible with the taint processing, but the use of a tainted value is not recorded because the label or tag was previously removed. Thus, the number of false negative security determinations can increase.

Implementations discussed herein include context-sensitive taint analysis systems that mitigate false negative security determinations. As a specific example, some implementations discussed herein include taint analysis systems that do not remove labels or tags from tainted values in response to taint processings applied to those tainted values. Rather, such tainted values are additionally or alternatively labeled or tagged using a processing state to identify the taint processings applied to these tainted values.

Additionally, these taint analysis systems monitor or track the output contexts of the applications with which these taint analysis systems are associated. When a tainted value is output from an application, the processing state of that tainted value is compared with the output context of the application. If the processing state (or the taint processing related to that processing state) is incompatible with the output context of the application, a notification can be generated to, for example, identify a potential security vulnerability in the application. If the processing state (or the taint processing related to that processing state) is compatible with the output context of the application, no notification is generated. In other words, the number of false negative security determinations can be reduced by comparing the type, class, or level of taint processing applied to a tainted value with the current output context of an application when the tainted value is output from the application. Thus, taint analysis applied by systems, methods, and apparatus discussed herein is context-sensitive.

As used herein, the term "module" refers to a combination of hardware (e.g., a processor such as an integrated circuit or other circuitry) and software (e.g., machine- or processor-executable instructions, commands, or code such as firmware, programming, or object code). A combination of hardware and software includes hardware only (i.e., a hardware element with no software elements), software hosted at hardware (e.g., software that is stored at a memory and executed or interpreted at a processor), or at hardware and software hosted at hardware. Furthermore, as used herein, the term "application" refers to a module that receives input, performs one or more operations with respect to that input, and provides an output. For example, an application can be a web application hosted at a web server that receives input values from a client via a communications link such as the Internet, processes the input values to generate output values, and provides the output values to the client via the communications link.

Additionally, as used herein, the singular forms "a," "an," and "the" include plural referents unless the context clearly dictates otherwise. Thus, for example, the term "tainted value" is intended to mean one or more tainted values or a combination of tainted values.

Figure 1:
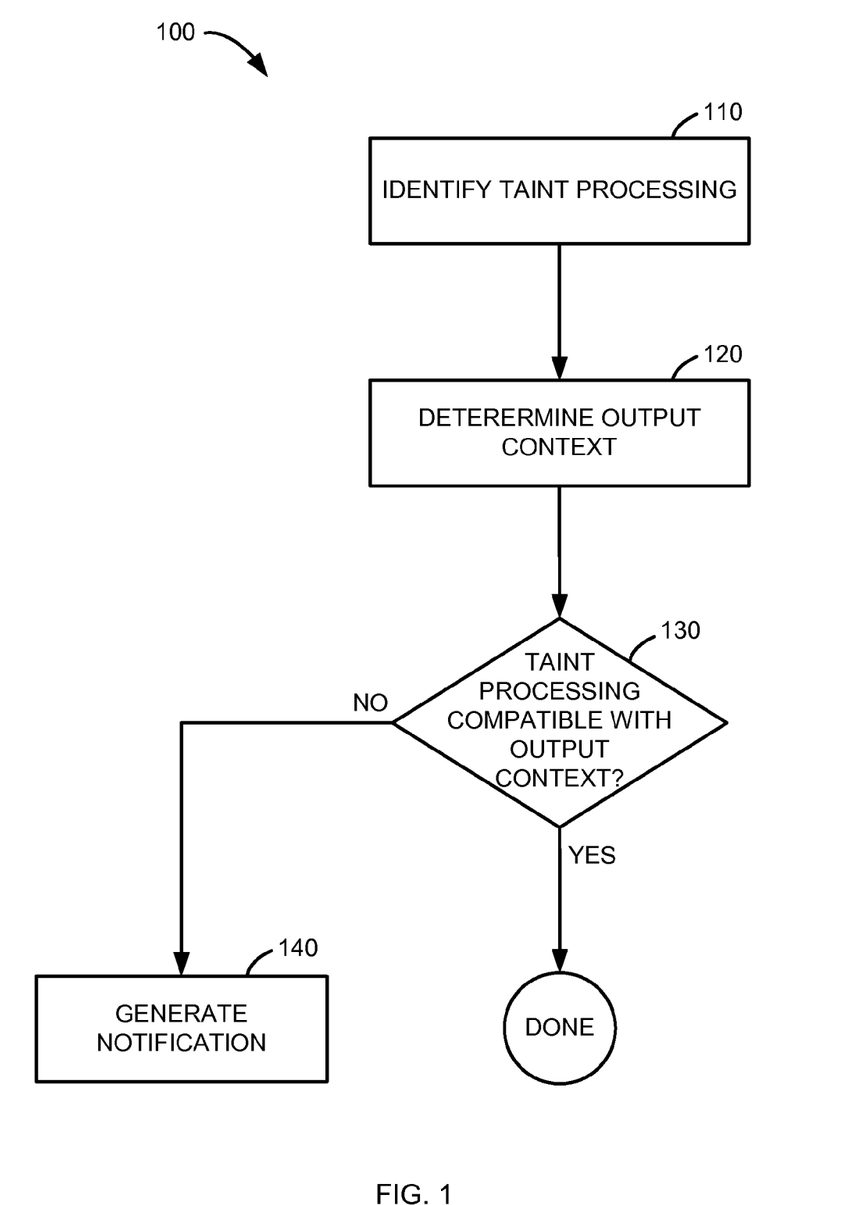
FIG. 1 is a flowchart of a taint analysis process, according to an implementation.

FIG. 1 is a flowchart of a taint analysis process, according to an implementation. A taint analysis system implementing process 100 can implement runtime taint analysis, static taint analysis, or hybrid runtime and static taint analysis. As an example of runtime taint analysis, a taint analysis system implementing process 100 can attach to a runtime environment in which an application can execute, identify tainted values received as input to the application, and apply blocks 110, 120, 130, and 140 to the tainted values when the tainted values are output from an application. As an example of static taint analysis, a taint analysis system implementing process 100 can parse resources (e.g., files) that define an application to identify variables or containers that can store tainted values, to identify output portions of the application at which the tainted values of those variables or containers are output, and to apply blocks 110, 120, 130, and 140 to the tainted values at those output portions of the application.

Process 100 can be implemented, for example, within a taint analysis system to determine whether output (e.g., data values output) from an application has been appropriately processed. Some data values output of the application are tainted values. Tainted values are data values that are received (e.g., as input to an application) from untrusted, unverified, or potentially harmful sources or derived from other tainted values (e.g., input to an application). For example, data values received as input from a client of the application, data values read from an untrusted (e.g., external or non-validated) data store, or data values derived from (e.g., generated from, calculated using, influenced from, or based on) tainted values can be referred to as tainted values.

Moreover, tainted values can include a single value such as a floating point or integer number, or can be sequences of values such as character or text strings. As a specific example, tainted values can be an exploitation vector for a security vulnerability such as cross-site scripting (XSS) vulnerability or structured query language (SQL) injection vulnerability of a web application. For example, input provided to a web application can include code that is executed at a client of the web application (e.g., a web browser) to attack the client. Furthermore, in some implementations, tainted values are labeled or tagged (e.g., by modifying the tainted values or associating metadata with the tainted values) as such.

A client of the application is a module from which input is received at the application and/or to which output is provided by the application. In other words, as used herein, the term "client" refers to any module that provides input to and/or receives output from an application. Thus, as used herein, the term "client" includes, for example, peers, clients and servers of a traditional client-server relationship, and masters and slaves of a traditional master-slave relationship associated with the application.

At block 110, a taint processing is identified for a tainted value output (or to be output) from an application. For example, an identifier of a taint processing (or a group of identifiers of taint processings) applied to the tainted value can be stored at a portion (or portions) of a data store such as a database or a table within a memory that is associated with the tainted value. The identifier (or group of identifiers) or portion of the data store including the identifier (or group of identifiers) can be referred to as the processing state of the tainted value. The processing state of the tainted value can be used to identify the taint processing applied to a tainted value at block 110. As a specific example, the processing state of a tainted value can identify an encoding routine or validation procedure applied to the tainted value.

A taint processing is any analysis, manipulation, modification, or other processing applied to a data value (such as a tainted value) to remove, mitigate, identify, or otherwise affect a security vulnerability or potential security vulnerability of that data value. For example, a taint processing can include input sanitization for an input string that will be used by an application as part of a Structured Query Language (SQL) query (e.g., to prevent SQL injection). As a specific example of sanitization, taint processing can include encoding data values output from an application using an escaped character set such as a Hypertext Markup Language (HTML) escape character set, a JavaScript escape character set, an Extensible Markup Language (XML) escape character set, a Cascading Style Sheets (CSS) escape character set, or other encoding. Such encodings can mitigate or prevent security vulnerabilities such as code or instruction injecting via XSS attacks.

A taint processing can be implemented as a module such as, for example, an application specific integrated circuit (ASIC) or a subroutine, a function, a method, a library routine (e.g., a routine defined at a library), or other group of instructions (or code representing instructions) hosted at a processor. For example, a taint processing can be an encoding routine defined at a library. A library is a group of codes or instructions that are executed at a processor to realize or implement one or more routines, subroutines, functions, or methods). The encoding routine receives a tainted value as an input and encodes the tainted value to mitigate a security vulnerability in the tainted value. As a more specific example, an identifier of a variable, container, or memory location at which the tainted value is stored is provided as input to the encoding routine, and the encoding routine encodes the tainted value within that variable, container, or memory location. In other words, the taint processing processes the tainted value in place.

In other implementations, a taint processing processes the tainted value out of place. That is, rather than processing the tainted value, the taint processing processes an independent copy of the tainted value. For example, a taint processing can be an encoding library routine that receives a tainted value as an input, generates an independent copy of the tainted value, encodes the independent copy of the tainted value, and returns the independent copy of the tainted value. An independent copy of a tainted value is stored at a variable, container, or memory location other than the variable, container, or memory location at which the tainted value is stored. That is, modifications to the tainted value are not applied to the independent copy of the tainted value.

In some such implementations, a processing state of the independent copy of the tainted value is maintained separate from a processing state of the tainted value. For example, a processing state of the independent copy of the tainted value can identify the taint processing, and a processing state of the tainted value does not identify the taint processing because the taint processing is applied to the independent copy of the tainted value rather that the tainted value. Moreover, in some implementations, the processing state of the independent copy of the tainted value is a copy of the processing state of the tainted value when the independent copy of the tainted value is generated by the taint processing. In other words, the processing state of the independent copy of the tainted value is initialized as a copy of the processing state of the tainted value because any taint processings applied to the tainted value when the independent copy of the tainted value is generated have been inherently applied to the independent copy of the tainted value.

In yet other implementations, a taint processing dynamically determines whether a tainted value should be processed in place or out of place. In other words, a taint processing can dynamically determine whether an independent copy of a tainted value will be generated. For example, a taint processing can process a tainted value in place if the taint processing does not modify the tainted value. If the taint processing does modify the tainted value, the tainted value is processed out of place. As a specific example, a text string can be a tainted value and a taint processing can be an encoding. If the text string does not include any characters that are encoded using other characters by the encoding, the text string can be processed (e.g., analyzed) by the encoding in place, and no independent copy of the text string is generated. However, if the text string does include characters that are encoded using other characters by the encoding, an independent copy of the text string is generated, and the independent copy of the text string is processed by the encoding.

In some implementations, a tainted value can be applied to more than one taint processing. For example, a tainted value can be applied to multiple encoding routines and/or validation procedures. Accordingly, a processing state can identify a group of taint processings. For example, a processing state can be a list of identifiers of taint processings applied to a tainted value. In some implementations, a processing state can identify an order or sequence in which the taint processings were applied to a tainted value. Each of such taint processings can be identified at block 110. In other implementations, only the last (i.e., most recent) or first taint processing applied to a tainted value is included in the processing state of that tainted value.

Taint processings applied to tainted values can be identified using a variety of methodologies. For example, a taint analysis system can attach to a runtime environment within which the application is executed and monitor the use of variables, containers, or memory locations at which tainted values are stored via the runtime environment. Each time such variables, containers, or memory locations are accessed by taint processings during execution (or runtime) of the application, the taint analysis system can update the processing state of the associated tainted values. Said differently, the taint analysis system can implement runtime taint analysis. As an alternative example, a taint analysis system can parse or analyze resources that define the application (e.g., source code or instruction files) to identify variables or containers that can store tainted values during execution of the application. Additionally, the taint analysis system can identify taint processings that are applied to such variables or containers based on function calls, subroutines, or other processing applied to the variables or containers within those resources. In other words, the taint analysis system can implement static taint analysis.

The output context of the application is then determined at block 120. An output context is a context in which data values are output from an application. Data values are output from applications when those data values (or copies thereof) are provided (e.g., via a communications link, shared memory, electronic mailboxes, intra-processor communications, inter-processor communications, or other data transfer methodologies) to another application, to a data stores, to a client.

For example, if the application is a web application, data values can be output via a communications link. Furthermore, the output context can be the interpretation context of the web application. In other words, the output context can be the context in which a client of the application (e.g., a web browser for a web application) receiving the data values output from the application interprets those data values. As specific example, the output context of a web application can be an HTML output context, a JavaScript output context, a CSS output context, or other output context in which the web application outputs data values to clients.

In some implementations, the output context of the application changes during execution of the application. Referring again to an example implementation in which the application is a web application, the application can output data values during execution that should be interpreted by a client as CSS data at a first time, as HTML at a second time, as JavaScript at a third time, and as HTML again at a fourth time. That is, output from the application can include data values in a CSS output context at a first time, data values in an HTML output context at a second time, data values in a JavaScript output context at a third time, and data values in an HTML output context at a fourth time. In such implementations, the current output context (e.g., the output context in which the tainted value for which taint processing was identified at block 110 is output) of the application is determined at block 120. In other words, the output context that is associated with output of the tainted value for which taint processing was identified at block 110 is determined at block 120.

The output context can be determined using a variety of methodologies. For example, the taint analysis system can monitor the output of the application to determine the output context of the application. More specifically, for example, the taint analysis system can include an output context monitor module that receives output from the application (e.g., via a runtime environment of the application) and interprets that output, for example, as a client of the application such as a web browser. The output context monitor module can, thus, track or monitor the current output context of the application. The taint analysis module can then access an identifier of the output context at the output context monitor module at block 120.

Alternatively, for example, in some implementations, the output contexts of the application can be identified statically based on analysis of resources of the application such as HTML files, CSS, files, Java Server Pages (JSP) files, or other resources, and the taint analysis system can determine the current output context of the application based on the resource from which output of the tainted value was triggered or initiated. Thus, as discussed above, the taint analysis system implementing process 100 can be a runtime taint analysis system or a static taint analysis system. In other implementations, the taint analysis system implementing process 100 can be a hybrid runtime and static taint analysis system.

At block 130, the taint processing identified at block 110 and the output context determined at block 120 are compared to determine whether the taint processing is compatible with the output context. Said differently, the taint processing and the output context are compared to determine whether the taint processing appropriately or effectively mitigate or eliminates a security vulnerability for the output context. Accordingly, a processing state of the tainted value can be compared with the output context (or an identifier thereof) to determine whether the taint processing is compatible with the output context.

For example, a security policy for an application can specify taint processings which are compatible with output contexts. As an example, a security policy can specify that an output-context-specific encoding is compatible with an associated output context, and that all other taint processing is incompatible with that output context. As a specific example, a security policy can specify that an HTML encoding is compatible with an HTML output context, a JavaScript encoding is compatible with a JavaScript output context, and a CSS encoding is compatible with a CSS output context.

As discussed above, multiple taint processings can be applied to the tainted value in some implementations. Accordingly, multiple taint processings can be compared with the output context at block 130. For example, each taint processing applied to the tainted value can be considered (e.g., compared with the output context) at block 130. In some implementations, only a subset of the multiple taint processings applied to the tainted value are considered at block 130. For example, the most recently applied taint processing or a most recently applied subset of the multiple taint processings are considered at block 130. As a specific example, a security policy associated with the application or taint analysis system can specify which taint processings of the multiple taint processings applied to the tainted value (e.g., the taint processings identified at block 110 based on a processing state for the tainted value) are considered at block 130.

If the taint processing is compatible with the output context at block 130, process 100 is complete for the tainted value. In other words, a taint analysis system implementing process 100 can determine that the tainted value does not pose a security vulnerability for the output context if the taint processing is compatible with the output context at block 130, and can proceed to, for example, execute process 100 for additional tainted values output from the application.

Alternatively, if the taint processing is not compatible with the output context at block 130, process 100 proceeds to block 140 at which a notification is generated. A notification provides feedback from the taint analysis system to flag, signal, or identify a potential security vulnerability (e.g., output or other use of a tainted value in an output context for which no compatible taint processing was applied to the tainted value). The notification can be, for example, a data set including a description of the use of the tainted value (e.g., identifier of a resource such as a file name and line number or offset within the resource at which the tainted value was used) written to a log file, sent to a system administrator (e.g., via electronic mail, instant message (IM), short messaging service (SMS), or displayed at a user interface.

Figure 2:
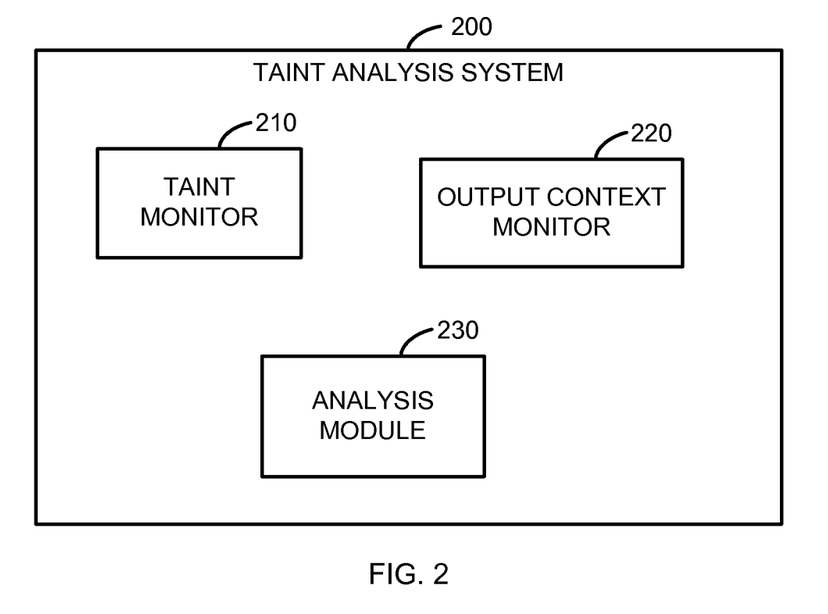
FIG. 2 is a schematic block diagram of a taint analysis system, according to an implementation.

FIG. 2 is a schematic block diagram of a taint analysis system, according to an implementation. Taint analysis system 200 includes taint monitor 210, output context monitor 220, and analysis module 230. Taint monitor 210, output context monitor 220, and analysis module 230 are modules that implement taint analysis system 200. Although various modules (i.e., combinations of hardware and software) are illustrated and discussed in relation to FIGS. 2 and 3 and other example implementations, other combinations or sub-combinations of modules can be included within other implementations. Said differently, although the modules illustrated in FIGS. 2 and 3 and discussed in other example implementations perform specific functionalities in the examples discussed herein, these and other functionalities can be accomplished at different modules or at combinations of modules. For example, two or more modules illustrated and/or discussed as separate can be combined into a module that performs the functionalities discussed in relation to the two modules. As another example, functionalities performed at one module as discussed in relation to these examples can be performed at a different module or different modules.

Taint monitor 210 monitors or tracks tainted values within an application to identify taint processings applied to those tainted values. For example, taint analysis system 200 can attach to an application within a runtime environment, and taint monitor 210 can monitor the use of variables, containers, or memory locations that store tainted values. Taint monitor 210 can, thereby, update a record of taint processings applied to those tainted values, such as a processing state for each of those tainted values, each time a taint processing is applied to those tainted values.

In some implementations, taint monitor 210 additionally determines when a tainted value is output from the application. For example, taint monitor 210 can detect when a tainted value (or a variable, container, or memory location that stores the tainted value) is used by an output module of the application. Taint monitor 210 can communicate (e.g., exchange signals, commands, instructions, or other information) with analysis module 230 to notify analysis module 230 of the output of a tainted value.

Output context monitor 220 monitors or tracks the output context of an application. In other words, output context monitor 220 maintains a description or identifier of the current output context of the application. Similar to the example discussed above in relation to taint monitor 210, for example, taint analysis system 200 can attach to an application within a runtime environment, and output context monitor 220 can monitor output from the application. More specifically, output context monitor 220 can receive the output from the application and interpret the output (e.g., the data value output) from the application as a client of the application to monitor the output context.

In some implementations, output context monitor 220 can intercept the output from the application, and provide the output to a client of the application after interpreting the output. In other words, taint analysis system 200 can attach to the application within the runtime environment such that the output from the application is provided to output context monitor 220 rather than to a client of the application. Output context monitor 220 can interpret the output, and then provide the output to the client. In some implementations, output context monitor 220 can communicate (e.g., exchange signals, commands, instructions, or other information) with analysis module 230 to determine whether output from the application should be provided to a client of the application. For example, if the output includes a tainted value to which no taint processing compatible with the output context of the application was applied, analysis module 230 can provide a command to output context monitor 220 to discard the output from the application and not provide the output to the client of the application (e.g., not transmit via a communications link). Said differently, output context monitor 220 can prevent (e.g., interrupt or disable) delivery of output from the application to a client. In some implementations, context monitor 220 can provide an error message or notification to the client if delivery of the output to the client is prevented.

Analysis module 230 compares taint processings applied to tainted values and output contexts in which the tainted values are output. Moreover, analysis module 230 determines whether the taint processings applied to tainted values are compatible with output contexts in which the tainted values are output. For example, analysis module 230 communicates with taint monitor 210 and output context monitor 220 to identify which taint processings have been applied to a tainted value output from the application and to determine the output context of the application associated with the tainted value (e.g., the current output context of the application when the tainted value is output). Analysis module 230 then determines whether a taint processing applied to the tainted value is compatible with the output context of the application associated with the tainted value. Moreover, for example as discussed above, analysis module 230 can communicate with output context monitor 220 to interrupt delivery of tainted values (e.g., output including tainted values) from the application to a client.

Taint analysis module 200 is an example implementation of a taint analysis system. Other taint analysis systems can include additional or different modules. For example, taint analysis system 320 illustrated in FIG. 3 includes additional modules.

Figure 3:
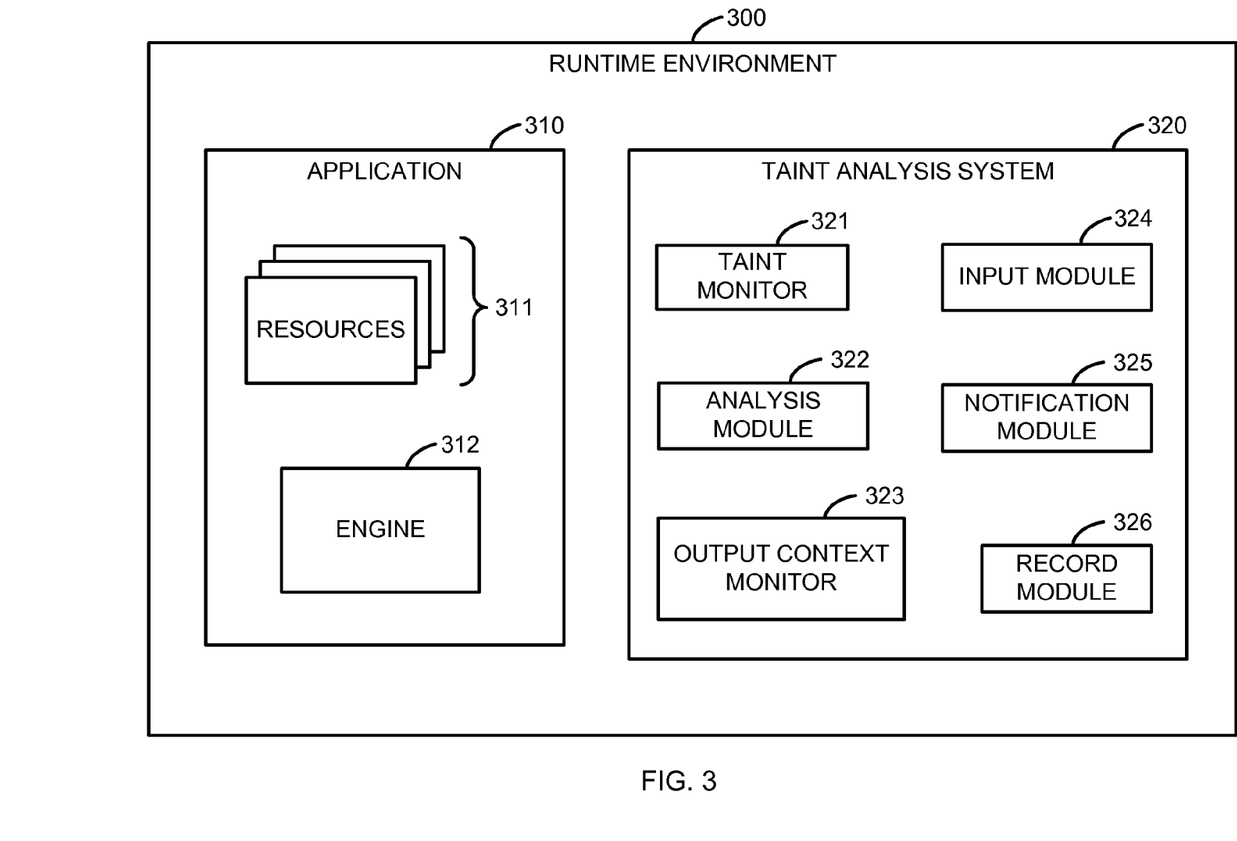
FIG. 3 is an illustration of a runtime environment including a taint analysis system, according to an implementation.
Figure 4:
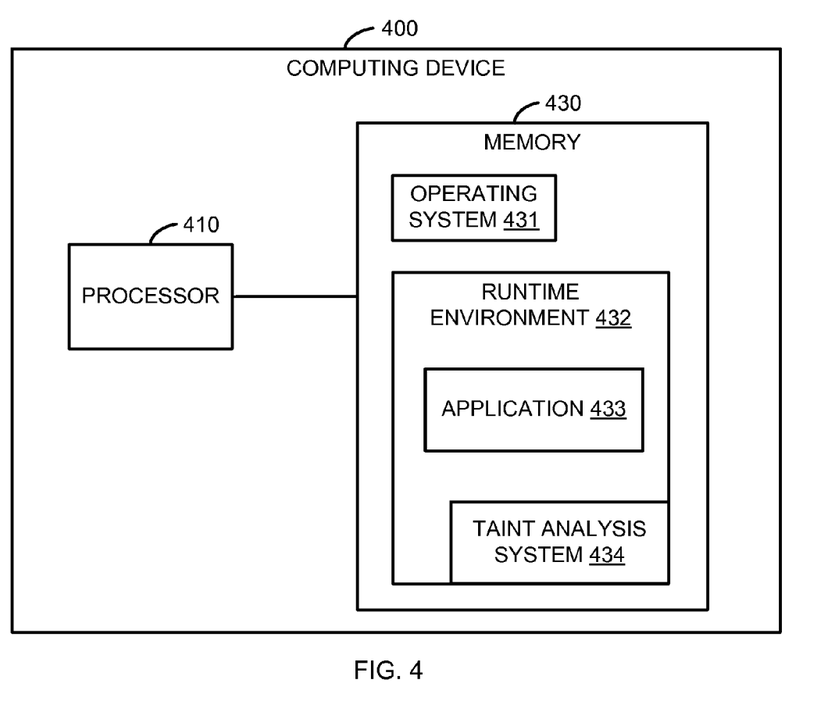
FIG. 4 is a schematic block diagram of a computing device including a runtime environment with a taint analysis system, according to an implementation.

FIG. 3 is an illustration of a runtime environment including a taint analysis system, according to an implementation. Runtime environment 300 is an environment hosted at a processor and memory accessible to the processor that provides various services to application 310. For example, FIG. 4 is a schematic block diagram of a computing device including a runtime environment and a taint analysis system, according to an implementation. Computing device 400 includes processor 410 and memory 430. Memory 430 includes operating system 431, runtime environment 432, application 433, and taint analysis system 434.

Processor 410 is any combination of hardware and software that executes or interprets instructions, codes, or signals. For example, processor 410 can be a microprocessor, an application-specific integrated circuit (ASIC), a distributed processor such as a cluster or network of processors or computing devices, a multi-core or multi-processor processor, or a virtual machine.

Memory 430 is a processor-readable medium that stores instructions, codes, data, or other information. As used herein, a processor-readable medium is any medium that stores instructions, codes, data, or other information non-transitorily and is directly or indirectly accessible to a processor. Said differently, a processor-readable medium is a non-transitory medium at which a processor can access instructions, codes, data, or other information. For example, memory 430 can be a volatile random access memory (RAM), a persistent data store such as a hard disk drive or a solid-state drive, a compact disc (CD), a digital video disc (DVD), a Secure Digital™ (SD) card, a MultiMediaCard (MMC) card, a CompactFlash™ (CF) card, or a combination thereof or other memories. In some implementations, memory 430 can be integrated with processor 410, separate from processor 410, or external to computing device 400.

Operating system 431, runtime environment 432, application 433, and taint analysis system 434 are each instructions or code that—when executed at processor 410—cause processor 410 to perform operations that implement, respectively, an operating system, a runtime environment, an application, and a taint analysis module. Said differently, operating system 431, runtime environment 432, application 433, and taint analysis system 434 are hosted at computing device 400.

In some implementations, computing device 400 can be a virtualized computing device. For example, computing device 400 can be hosted as a virtual machine at a computing server. Moreover, in some implementations, computing device 400 can be a virtualized computing appliance, and operating system 431 is a minimal or just-enough operating system to support (e.g., provide services such as a communications stack and access to components of computing device 400 such as a communications interface module (not shown)) taint analysis system 434.

Taint analysis system 434 can be accessed or installed at computing device 400 from a variety of memories or processor-readable media. For example, computing device 400 can access a remote processor-readable medium via a communications interface module (not shown), and taint analysis system 434 at that processor-readable medium. As a specific example, computing device 400 can be a thin client that accesses operating system 431 and taint analysis system 434 during a boot sequence.

As another example, computing device 400 can include (not illustrated in FIG. 4) a processor-readable medium access device (e.g., CD, DVD, SD, MMC, or a CF drive or reader) and taint analysis system 434 at a processor-readable medium via that processor-readable medium access device. As a more specific example, the processor-readable medium access device can be a DVD drive at which a DVD including an installation package for taint analysis system 434 is accessible. The installation package can be executed or interpreted at processor 410 to install taint analysis system 434 at computing device 400 (e.g., at memory 430). Computing device 400 can then host or execute taint analysis system 434.

In some implementations, taint analysis system 434 can be accessed at or installed from multiple sources, locations, or resources. For example, some components or modules of taint analysis system 434 can be installed via a communications link, and other components or modules of taint analysis system 434 can be installed from a DVD.

Referring to FIG. 3, a runtime environment provides, for example, libraries, input and output routines, code interpretation, execution isolation, and/or services during execution or runtime of application 310 at the processor. In other words, application 310 executes within runtime environment 300. As specific examples, runtime environment 300 can be a virtual machine, a Java™ Runtime Environment, or a Microsoft .NET™ runtime environment.

Taint analysis system 320 can attach to or instrument runtime environment 300 (or to application 310 via runtime environment 300) to interact with application 310. For example, runtime environment 300 can implement an application programming interface (API), hooks (e.g., to manipulate handling of library routine or function calls, method invocations, messages, or events), or other mechanisms via which taint analysis system 320 can interact with application 310 during execution (or runtime) of application 310. In other implementations, taint analysis system 320 can instrument runtime environment 300 with modified libraries or other resources via which taint analysis system 320 can interact with application 310 during execution of application 310. Said differently, taint analysis system 320 can modify or instrument runtime environment 300, and interact with application 310 via the modifications or instrumentation to runtime environment 300.

As an example, taint analysis module 320 can replace an output library of runtime environment 300 with a modified output library that allows taint analysis system 320 to receive output from application 310. As another example, taint analysis module 320 can substitute a library that defines taint processings within runtime environment 300 that dynamically determine where tainted values are processed in place or out of place with a library which defines taint processings that process all tainted values out of place. Accordingly, independent copies of tainted values are generated and processed (e.g., taint processings are applied to the independent copies of the tainted values) when those taint processings are applied to those tainted values within application 310.

Such a substitution of taint processings can be useful to allow taint analysis module 320 to independently track or discriminate among code or execution paths within application 310 in which a taint processing is applied to a tainted value and other code or execution paths in which no (or different) taint processings are applied to the tainted value. In other words, taint analysis module 320 can track a tainted value through code or execution paths of application 310 including the tainted value, and separately track an independent copy of the tainted value through code or execution paths of application 310 including the independent copy of the tainted value. Such tracking can allow taint analysis module 320 to identify security vulnerabilities in application 310 that taint analysis module 320 would not otherwise identify during taint analysis of application 310 due to the tainted values used to during taint analysis.

Application 310 includes resources 311 and engine 312. In some implementations, engine 312 is a module that includes logic that implements application 310. That is, engine 312 defines the operation of application 310. Engine 312 can access resources 311 to provide a service to clients of application 310. In other words, engine 312 defines the functionalities of application 310. In other implementations, resources 311 include instructions that describe the functionalities of application 310. Engine 312 accesses and interprets resources 311 to provide a service to clients of application 310. That is, resources 311 define the functionalities of application 310.

In yet other implementations, both engine 312 and resources 311 define the functionalities of application 310. Said differently, some functionalities of application 310 are defined at engine 312, and other functionalities of application 310 are defined at resources 311. For example, engine 312 can be a web server that includes an interpreter for resources 311. As a specific example, engine 312 can be the Apache Tomcat™ Java™ servlet container and resources 311 can include JSP files.

Taint monitor 321, analysis module 322, and output context monitor 323 are similar to taint monitor 210, output context monitor 220, and analysis module 230, respectively, discussed above in relation to FIG. 2. Input module 324 identifies input (e.g., data values input) to application 310 and labels or tags that input (or the variables, containers, or memory locations that store the data values input) as tainted. For example, input module 324 can identify containers defined within resources 311 (e.g., structures defined within resources 311 at which data values can be stored), and can monitor the use of those containers during runtime via runtime environment 300. When data values are input to those containers (e.g., received at application 310 from a client such as a web browser, data store, or other source), input module 324 can label those containers (e.g., at a portion of a table within a memory) as tainted. Taint monitor 321 can access such labels to determine which data values are tainted values and should be monitored.

Notification module 325 generates a notification if a tainted value is output in an output context of the application with which no taint processing applied to the tainted value was applied. For example, notification module 325 can communicate with analysis module 322. If analysis module 322 determines that no taint processing applied to the tainted value is compatible with the output context in which the tainted value is output, analysis module 322 can provide a signal or command to notification module 325 to cause notification module 325 to generate a related notification.

Record module 326 maintains a record of taint processings applied to tainted values and the output contexts of application 310 within which tainted values are output. For example, record module 326 can communicate with taint monitor 321 to determine when taint processings are applied to tainted values and when tainted values are output from application 310. Additionally, record module 326 can communicate with output context monitor 323 to determine the output context of application 310 when tainted values are output. Record module 326 stores information related to the taint processing applied to tainted values and output contexts associated with tainted values (e.g., in which tainted values are output). For example, record module 326 can store the output context of application 310 and processing state of a tainted value at a data store each time the tainted value is output from application 310 regardless of whether a taint processing identified by the processing state is compatible with the output context. In other words, record module 326 can generate audit records related to the output of tainted values.

Figure 5:
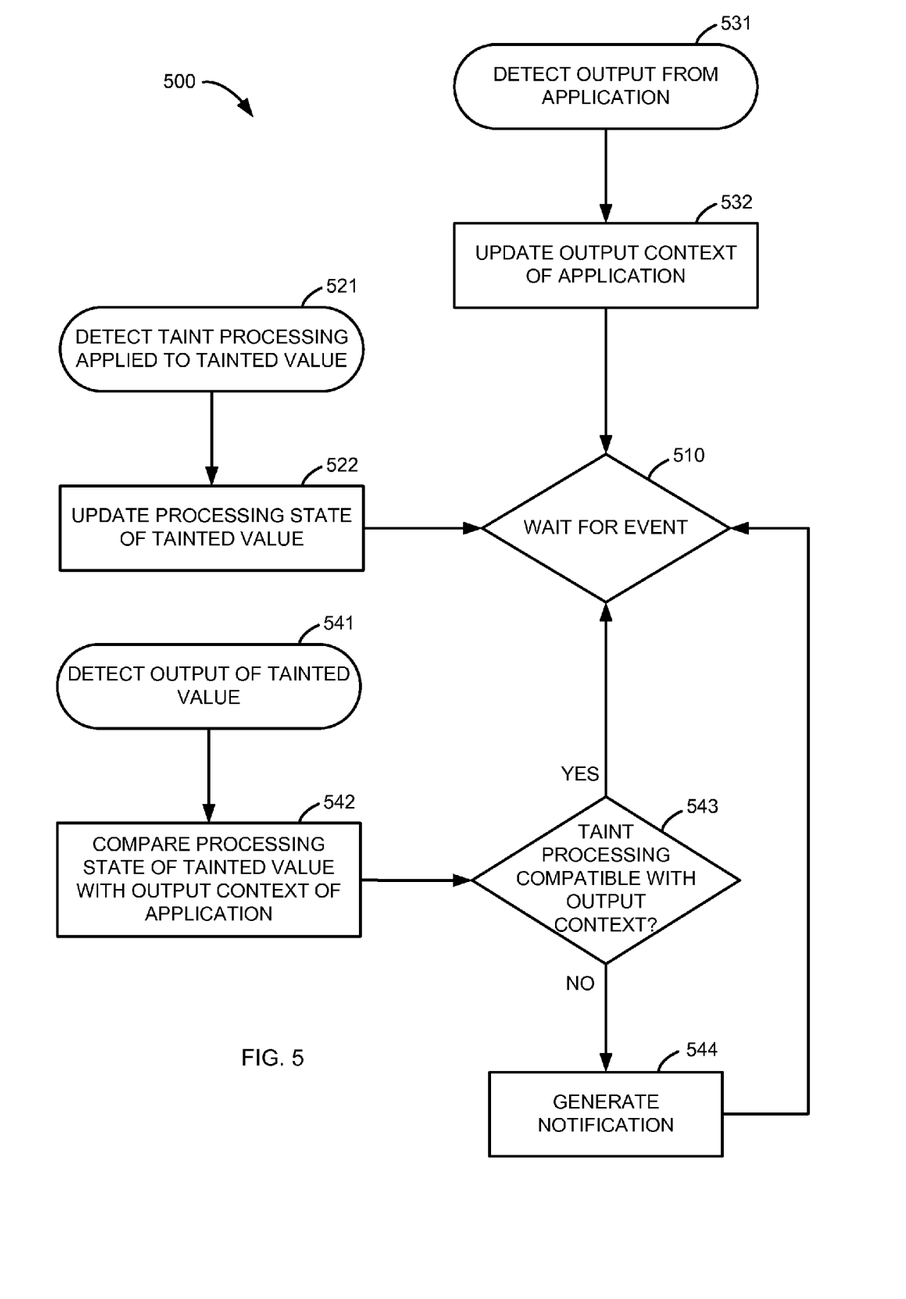
FIG. 5 is a flowchart of a taint analysis process, according to another implementation.

FIG. 5 is a flowchart of a taint analysis process, according to another implementation. Process 500 waits at block 510 for events related to tainted values. In other words, process 500 monitors tainted values of an application for taint processings applied to those tainted values and monitors output from the application for tainted values and to determine that output context of the application (e.g., the current output context of the application) at block 510. If taint processing applied to a tainted value is detected at block 521, the processing state of that tainted value is updated at block 522. For example, if a memory location at which the tainted value is stored is provided to an encoding routine, an identifier of that encoding routine can be added to a processing state of the tainted value. As a specific example, the identifier of the encoding can be added to a portion of a data store (e.g., a row or multiple rows of a database or table at a memory) associated with the tainted value and at which the processing state of the tainted value is stored. Process 500 then proceeds to block 510 and waits or monitors the application for additional events.

If output from the application is detected at block 531, the output context of the application is updated at block 532. For example, the output from the application can be parsed (or analyzed or interpreted) to determine whether the output context of the application is altered by the output. If the output context is altered, an identifier (or an output context identifier) of the current output context of the application can be assigned a value associated with the altered output context. As a specific example in which the application is a web application with CSS, HTML, and JavaScript output contexts, the output from the application can be parsed to determine whether the application is outputting CSS, HTML, or JavaScript data (e.g., code or markup). If the previous output context (e.g., the output context before the output was detected at block 531) was a CSS context and the output from the application indicates that the altered output context is an HTML context, an identifier of the current output context of the application can be updated to have a value associated with an HTML context. Accordingly, the output context (or current output context) of the application can be monitored or tracked by a taint analysis system implementing process 500. Process 500 then proceeds to block 510 and waits or monitors the application for additional events.

If output of a tainted value is detected at block 541, the processing state of the tainted value is compared with the output context of the application at block 542. If the taint processing identified in the processing state of the tainted value (e.g., a taint processing applied to the tainted value) is compatible with the output context at block 543, process 500 proceeds to block 510 and waits or monitors the application for additional events. However, if the taint processing identified in the processing state of the tainted value is not compatible with the output context at block 543, process 500 proceeds to block 544 at which a notification is generated. After the notification is generated, process 500 proceeds to block 510 and waits or monitors the application for additional events.

In some implementations, the blocks of process 500 can be rearranged, process 500 can include additional blocks, or process 500 can include different blocks. As an example, process 500 can detect events during processing of other events. More specifically, for example, as discussed above, output from the application can be parsed, analyzed, and/or interpreted after output is detected at block 531. If that output includes a tainted value, the parsing, analyzing, and/or interpreting can be interrupted, and output context of the application can be updated at block 532. Rather than proceed to block 510 from block 532 as illustrated in FIG. 5, process 500 can proceed to block 541 at which the output of the tainted value is detected. Process 500 then proceeds to blocks 542, 543, and, if appropriate, to block 544 as discussed above. If there is remaining output that was previously detected at block 531, but was not processed due to output of the tainted value, process 500 proceeds to block 531 rather than block 510 to finish processing (or handling) the remaining output. If there is no remaining output, process 500 proceeds to block 510.

While certain implementations have been shown and described above, various changes in form and details may be made. For example, some features that have been described in relation to one implementation and/or process can be related to other implementations. As a specific example, implementations discussed in relation to runtime taint analysis can be applicable to static taint analysis. In other words, processes, features, components, and/or properties described in relation to one implementation can be useful in other implementations. As another example, functionalities discussed above in relation to specific modules or elements can be included at different modules, engines, or elements in other implementations. Furthermore, it should be understood that the systems, apparatus, and methods described herein can include various combinations and/or sub-combinations of the components and/or features of the different implementations described. Thus, features described with reference to one or more implementations can be combined with other implementations described herein.

What is claimed is:

1. A non-transitory processor-readable medium storing code that when executed by at least one processor causes the at least one processor to:
   identify a taint processing applied to a tainted value of an application;
   determine a first output context of the application associated with output of the tainted value from the application;
   determine whether the taint processing is effective in mitigating a security vulnerability caused by the tainted value for the first output context, wherein the application includes a plurality of output contexts including the first output context; and
   generate a notification if the taint processing is determined to be ineffective in mitigating the security vulnerability caused by the tainted value for the first output context, wherein the taint processing is ineffective in mitigating the security vulnerability caused by the tainted value for the first output context, but the taint processing is effective in mitigating the security vulnerability caused by the tainted value for another of the plurality of output contexts.

2. The processor-readable medium of claim 1, wherein:
   the tainted value is derived from a runtime input of the application; and
   the first output context is a runtime output context.

3. The processor-readable medium of claim 1, wherein identifying the taint processing comprises identifying processing that mitigates the security vulnerability caused by the tainted value.

4. The processor-readable medium of claim 3, wherein the taint processing includes an encoding of the tainted value.

5. The processor-readable medium of claim 1, wherein:
   the tainted value is a first tainted value; and
   the first tainted value is an independent copy of a second tainted value provided as an input to the taint processing.

6. The processor-readable medium of claim 1, wherein the taint processing is a first taint processing defined at a first library, the processor-readable medium further storing code that when executed by the at least one processor causes the at least one processor to substitute a second library with the first library.

7. A context-sensitive taint analysis system, comprising:
   a taint monitor to monitor a taint processing of a tainted value of an application;
   an output context monitor to monitor a current output context from a plurality of output contexts of the application; and
   an analysis module to:
      determine that the tainted value is associated with output of the current output context, and
      determine whether the taint processing applied to the tainted value is effective in mitigating a security vulnerability caused by the tainted value for the current output context, wherein the taint processing is ineffective in mitigating the security vulnerability caused by the tainted value for the current output context, but the taint processing is effective in mitigating the security vulnerability caused by the tainted value for another of the plurality of output contexts.

8. The system of claim 7, wherein the taint processing includes an encoding of the tainted value.

9. The system of claim 7, further comprising a notification module to generate a notification if the taint processing applied to the tainted value is ineffective in mitigating the security vulnerability caused by the tainted value for the current output context.

10. The system of claim 7, further comprising an input monitor to monitor runtime input to the application, the tainted value derived from an input value from the runtime input, wherein the current output context is a context relating to an interpretation of a data value output by the application.

11. The system of claim 7, wherein the taint monitor is configured to monitor a plurality of taint processings applied to the tainted value, the plurality of taint processings including the taint processing.

12. The system of claim 7, wherein the analysis module is configured to determine whether the taint processing applied to the tainted value is effective in mitigating the security vulnerability for the current output context based on a security policy associated with the application.

13. The processor-readable medium of claim 1, further comprising code that when executed by the at least one processor causes the at least one processor to:
   update a processing state associated with each tainted value from a plurality of tainted values in response to each taint processing from a plurality of taint processings applied to respective tainted value of the plurality of tainted values;
   update an output context identifier associated with the application in response to output from the application; and
   compare a processing state of a tainted value from the plurality of tainted values with the output context identifier if that tainted value is output from the application.

14. The processor-readable medium of claim 13, further comprising code that when executed by the at least one processor causes the at least one processor to generate a notification in response to the comparing if the processing state of that tainted value is not compatible with the output context identifier.

15. The processor-readable medium of claim 13, wherein at least a portion of the plurality of taint processings are encodings.

16. The processor-readable medium of claim 13, further comprising code that when executed by the at least one processor causes the at least one processor to parse the output from the application, wherein updating the output context identifier is based on the parsing.

17. The processor-readable medium of claim 13, further comprising code that when executed by the at least one processor cause the at least one processor to parse the output from the application, wherein updating the output context identifier is based on the parsing, the parsing emulating an web browser rendering engine.

18. The processor-readable medium of claim 3, wherein the taint processing includes a validation to check that the tainted value does not include data that opens a vulnerability in the application.

19. The processor-readable medium of claim 1, further storing code that when executed by the at least one processor causes the at least one processor to identify the tainted value by determining that the tainted value is based on data from an untrusted or unverified source received at an input of the application, and wherein the first output context is a context relating to an interpretation of a data value output by the application.

20. The system of claim 7, wherein the tainted value is based on data from an untrusted or unverified source received at an input of the application, and wherein the current output context is a context relating to an interpretation of a data value output by the application.

21. The processor-readable medium of claim 1, wherein the taint processing is ineffective in mitigating the security vulnerability caused by the tainted value for the first output context if the taint processing is not compatible with the first output context.

22. The system of claim 7, wherein the taint processing is ineffective in mitigating the security vulnerability caused by the tainted value for the current output context if the taint processing is not compatible with the first output context.

* * * * *